United States Patent [19]

Alder et al.

[11] Patent Number: 5,773,136
[45] Date of Patent: Jun. 30, 1998

[54] POLYMERIC FILMS

[75] Inventors: Paul Thomas Alder; Dawn Janine King, both of Swindon, England

[73] Assignee: Hoechst Trespaphan GmbH, Germany

[21] Appl. No.: 693,258

[22] PCT Filed: Dec. 21, 1995

[86] PCT No.: PCT/GB95/03015

§ 371 Date: Aug. 20, 1996

§ 102(e) Date: Aug. 20, 1996

[87] PCT Pub. No.: WO96/20085

PCT Pub. Date: Jul. 4, 1996

[30] Foreign Application Priority Data

Dec. 23, 1994 [GB] United Kingdom .................... 9426093
Nov. 24, 1995 [GB] United Kingdom .................... 9524085

[51] Int. Cl.$^6$ ............................................. B32B 27/32
[52] U.S. Cl. ..................................... 428/307.3; 428/319.9; 428/354; 428/516
[58] Field of Search .............................. 428/317.3, 319.9, 428/354, 516

[56] References Cited

U.S. PATENT DOCUMENTS

| | | | |
|---|---|---|---|
| 4,615,926 | 10/1986 | Hsu et al. | 428/35 |
| 4,700,531 | 10/1987 | Hsu et al. | 53/412 |
| 4,704,314 | 11/1987 | Hsu et al. | 428/35 |
| 4,881,649 | 11/1989 | Hsu et al. | 206/634 |
| 4,882,229 | 11/1989 | Hwo | 428/461 |
| 5,175,035 | 12/1992 | Pinsolle et al. | 428/35.7 |
| 5,302,442 | 4/1994 | O'Brien et al. | 428/213 |

*Primary Examiner*—Helen Lee
*Attorney, Agent, or Firm*—Bacon & Thomas

[57] ABSTRACT

Multilayer polymeric film comprising a base layer of a propylene polymer, a non-voided intermediate layer on the base layer, and a heat sealable polymer layer on the intermediate layer, the non-voided intermediate layer having an internal cohesive strength less than the bond strength of the intermediate layer to either the base layer or the heat sealable layer and less than the internal cohesive strengths of either the base layer or the heat sealable layer. Such films enable peelable heat seals to be formed by rupture of the intermediate layer due to its lower internal cohesive strength compared with the core layer or the heat seal layer.

20 Claims, No Drawings

POLYMERIC FILMS

BACKGROUND OF THE INVENTION

1. Field of the Invention

This invention concerns polymeric films and more particularly polyolefin films which form peelable heat seals.

2. Description of Related Art

Heat sealable polyolefin films which form peelable heat seals have been proposed hitherto in which the films either part from each other or from a substrate to which they have been heat sealed, when the heat seal is pulled apart. An example of such a heat sealable film is described in WO93/17863, peelability resulting either from a relatively weak heat seal between the film and the substrate to which it has been attached or by delamination of a layer of the olefin polymer which forms the heat seal from other layers of which the film is constructed.

The disadvantage of providing a peelable seal which parts at the heat seal between a polyolefin film and a substrate to which it has been heat sealed is that the peelability can be unpredictable. If the heat seal layer of the film forming the peelable seal forms a particularly strong bond to the substrate to which it is heat sealed, peelability may be difficult, requiring a high force to separate the sealed surfaces. On the other hand, if the heat seal is too weak, the seal can be broken before being required, for example merely by the forces involved in handling packages including the heat seals.

Peelability resulting from delamination of a heat sealable polymer layer from other layers of the film would be expected to be more predictable. However, such delamination requires a low inter-ply bond strength between the heat-seal layer of the film and the remainder of the film, and this in turn tends to give rise to unpredictable results for the bond strength between the heat seal layer and substrates to which the film is heat sealed.

In addition to these problems with the peelability of these prior art films, they do not provide good tamper evidence.

Tamper evident films giving good evidence of tampering have, however, been proposed hitherto, these including a layer of polypropylene containing a relatively large amount of a particulate filler which induces microvoids during biaxial stretching of the film during their manufacture. Instead of such films parting from substrates to which they have been heat sealed or delaminating when their heat seals are pulled open, the layer including the microvoids ruptures and splits open, parts of the layer being left on both of the peeled apart surfaces. Such films tend to give predictable results since peelability is not a function of the ability of layers to be separated from substrates to which they have been heat sealed, they don't rely on low inter-ply bond strengths which can lead to weak heat seals to substrates, and they do show good evidence that the seals have been peeled, that is tamper evidence. However, such films have the inherent problem of being opaque as a result of the presence of the high number of microvoids.

SUMMARY OF THE INVENTION

According to the present invention there is provided multilayer polymeric film comprising a base layer of a propylene polymer, a non-voided intermediate layer on the base layer, and a heat sealable polymer layer on the intermediate layer, the non-voided intermediate layer having an internal cohesive strength less than the bond strength of the intermediate layer to either the base layer or the heat sealable layer and less than the internal cohesive strengths of either the base layer or the heat sealable layer.

It is generally preferred that the internal cohesive strength of the intermediate layer is less than that of other layers in the film, and particularly less than that of either the base layer or the heat seal layer to which it is attached, or the cohesive strength of the intermediate layer to either of these layers.

DETAILED DESCRIPTION OF THE INVENTION

The present invention provides heat sealable films which can be readily peeled. Furthermore, particularly when the films are substantially transparent, they can indicate where peeling of the films has occurred by an increase in opacity in those regions where peeling has taken place. The peelability results from the relatively weaker internal cohesive strength of the intermediate layer compared with that of the intermediate layer to either of the layers to which it is attached and weaker than the internal cohesive strengths of other layers of the films, and particularly the layers to which it is directly attached.

It is furthermore preferred that the internal cohesion of the intermediate layer is less than the heat seal strength of the heat sealable polymer layer to the material to which it is eventually heat sealed. Apart from the nature of the heat sealable polymer itself, this does, of course, depend on the nature of the material to which the films are heat sealed and the conditions under which the heat sealing takes place. This may necessitate selecting the composition of the intermediate layer to achieve an internal cohesive strength of sufficiently low a value.

The base layer can be of a propylene homopolymer or a copolymer of propylene with one or more aliphatic alkenes, for example ethylene and/or butene-1, and it can be substantially clear or opaque. When the base layer or any other layer of films of the present invention is opaque, the films will usually not provide evidence of tampering after the heat seals have been peeled. In some cases, however, opaque seals may show a reduction in the gloss of the outer layers of the films where peeling has taken place.

The intermediate layer is preferably a blend of polymers such that the blend does not cocrystallise and that no interface is created within the interlayer. Such non-cocontinuous structures are believed to fail by a mechanism whereby failure propagates through domain boundaries between the components of the blend, and this occurs preferentially by ductile failure. Thus the intermediate layer will often result in films of the present invention having increased haze compared with analogous films without the intermediate layer. Where substantially transparent films are required it is preferred that this increase in haze is not so great that the intermediate layer becomes essentially non-transparent, but a non-transparent intermediate layer can be used when the films themselves are to be opaque.

The intermediate layer is preferably a blend of a propylene polymer and an ethylene polymer. The propylene polymer is preferably a propylene homopolymer or a copolymer of propylene and ethylene having an ethylene content of not more than 2 weight percent and more preferably not more than 1 weight percent with the balance being essentially polymerized propylene. The propylene polymer preferably has a high isotactic content, and especially greater than 95 weight percent. The ethylene polymer is preferably a copolymer of ethylene with at least one alpha-olefin, for example copolymers of ethylene with propylene, butene-1 or 4-methylpentene-1.

The ethylene polymers used in the blend used for the intermediate layer are preferably ethylene/butene-1 copolymers, optionally containing units derived from one or more other alpha-olefin, units derived from ethylene in each case forming the predominant part of the copolymers. Particularly preferred are polymers containing from 80 to 95 percent by weight of units derived from ethylene and 20 to 5 percent by weight of units derived from butene-1 with substantially no units derived from other olefins. A particularly preferred ethylene polymer contains about 90 percent by weight of units derived from ethylene and about 10 percent by weight of units derived from butene-1.

The weight ratio of propylene polymer to ethylene polymer used for the intermediate layer will usually depend on the nature of the ethylene polymer itself. In general, the weight ratio of propylene polymer to ethylene polymer will be in the range of from 70:30 to 30:70, and more particularly from 60:40 to 40:60. Especially preferred blends contain approximately equal weights of an ethylene copolymer containing about 90 percent by weight of ethylene and about 10 percent by weight of butene-1 and a propylene homopolymer.

In forming blends for the intermediate layer of films of the present invention, care should be exercised in the blending process since excessive working of the mixture can result in the internal cohesive strength of intermediate layers produced therefrom increasing to unacceptable levels so that internal cohesive forces within the layer become too high for peeling to take place within the intermediate layer. Blending should therefore be carried out to an extent necessary to result in a substantially transparent intermediate layer without working the blend to such an extent that the internal cohesion of the intermediate layer increases to unacceptably high levels. In order to reduce overworking of the mixture, instead of forming a premix from melts of the polymers for the intermediate layer and then using the premix as a feed to the extruder which is used to form the intermediate layer when the films are being manufactured, a mixture of pellets of the individual polymers required in the intermediate layer can be fed to the extruder.

The heat sealable layer can be made from any of a variety of heat sealable polymers known in the art provided the cohesion of the heat sealable layer to the intermediate layer is greater than the internal cohesion of the intermediate layer itself. Typically, the heat sealable polymer can be selected from olefin copolymers, and more particularly from copolymers containing units derived from at least two of ethylene, propylene and butene-1. Particularly preferred are heat sealable layers produced from propylene/ethylene/copolymers and/or propylene/ethylene/butene-1 terpolymers.

In general, it is preferred that the heat sealable polymer used for the outer, heat sealable layer is different from the copolymer component of the blend used to form the intermediate layer.

Where transparent films are required, it is generally preferred that the base layer of films of the present invention is non-voided, since this enables the peelable seals to provide an indication of peeling if other layers of the films are also substantially transparent. However, the base layer, and indeed other layers of the films of the present invention, can, if desired, be voided and/or pigmented. If voiding and/or pigmenting are used for any layer of films of the present invention, it is preferred that it should not be such that peeling of the films occurs within the voided layer rather than within the intermediate layer.

Voiding of the base layer can be effected by means known in the art, in particular by the inclusion of a particulate voiding agent within the base layer and then biaxially orienting the film. Organic or inorganic voiding agents can be used, examples of organic voiding agents including polyesters, e.g. polyethylene terephthalate or polybutylene terephthalate, polyamides, e.g. nylons, and examples of inorganic voiding agents including chalk, talc, barium sulfate and zinc sulfide.

The base layer and/or other layers of films of the present invention can be pigmented, a preferred pigment being titanium dioxide. It is, however, generally preferred that the intermediate layer with the relatively low internal cohesive strength does not include a pigment.

Films of the present invention can consist of the three above specified layers. However, they can include one or more further layers on the surface of the base layer remote from the specified intermediate layer and outer heat sealable layer. Such other layers can be a single heat sealable layer, for example of a heat sealable olefin polymer or copolymer, or they can be combinations of two or more polymeric layers, for example another intermediate layer as is present on the other surface of the base layer and an associated heat sealable polymeric layer thereon.

The combination of the intermediate layer of a blend of polymers with relatively low cohesive strength and the outer heat sealable layer will usually form an internal surface of a heat sealed package formed from films of the present invention since it is this heat sealable layer which will be used to form heat seals and thereby enable the peelability of this intermediate layer to be exploited. The other surface of the films can therefore be selected to provide various effects. For example, they can include one or more further layers, the outer surface of the films preferably being printable. If desired, films of the present invention can include a metallized layer on the opposite side of the base layer from the combination of the polymer blend and the heat sealable layer. The films can also be used as one web of a laminate to another film which may, for example, be printable and/or include a metal layer.

The various layers of films of the present invention can usually be made to any desired thickness. However, it is generally preferred that the intermediate layer is at least 1.5 $\mu$m thick, in order for it to function satisfactorily as an indicator of tampering.

Although the intermediate layer can be 10 $\mu$m thick, or more, it is preferably from 2 to 9 $\mu$m or more preferably 3 to 7 $\mu$m thick in order to impart the ability to show good evidence of tampering whilst not substantially reducing the mechanical properties of the films or increasing their haze to unacceptable levels.

Films in accordance with the present invention can include various additives conventionally used in polypropylene films. For example, their outer layers will usually include at least one antiblock agent which can be organic or inorganic, an example of an antiblock agent which can be used being silica. The base layer can also contain one or more migratory additives which affect the properties of the films, examples of these being antistatic agents and slip agents.

Films in accordance with the present invention can be produced by known methods, a preferred method being to coextrude melts of the polymers for the respective layers, plus any additives, through a slot die to form a flat polymer web which is than stretched in the direction of extrusion and than transversely before being wound up. If desired, either or both outer surfaces of the films can be subjected to a treatment to increase the surface energy of the films, for example corona discharge treatment or flame treatment. Such treatments are preferably effected after transverse stretching but before they are wound up.

The following Examples are given by way of illustration only. All percentages of additives present are by weight of the respective layers in which they are present, and all percentages of monomer contents of the various copolymers are by weight of the respective copolymers.

EXAMPLE 1

A 50:50 percent by weight mixture of granules of propylene homopolymer and granules of an ethylene/butene-1 copolymer (90 percent by weight ethylene, 10 percent by weight butene-1) were blended using a Baker Perkins Twin-screw compounder. The blend was used to form one layer of a four layer polymeric web as will now be described.

The four layer polymeric web was produced by coextruding through a slot die a core layer of polypropylene homopolymer, on one side of the core layer an intermediate layer of the above described blend of polypropylene homopolymer and an ethylene/butene-1 copolymer, and two outer layers of a propylene/ethylene copolymer containing 4 wt % of ethylene using melts of the respective polymers.

The web was cooled on a chill roll and then stretched 4.5 times in the direction of extrusion by passing it over a series of heated rollers rotating at different peripheral speeds. Thereafter it was stretched 10 times in the transverse direction in a stenter oven. The resulting biaxially stretched film was heat set, following which it was wound up into a roll.

The film had an overall thickness of 35 μm, the core layer being 27.2 μm, the intermediate layer 5 μm, and each outer layer 1.4 μm.

EXAMPLE 2

A five layer polymeric film was produced in a similar manner to that described in Example 1, an intermediate layer of the composition described in Example 1 being coextruded between each outer layer and the core layer.

The resulting film had an overall thickness of 35 μm, the core layer being 22.2 μm, the intermediate layers were both 5 μm, and each outer layer was 1.4 μm.

EXAMPLE 3

A five layer polymeric film was produced as described in Example 2 but using a blend of 60 percent by weight of propylene homopolymer and 40 percent by weight of the ethylene/butene-1 copolymer.

The respective film layers of the resultant film were as are given in Example 2.

EXAMPLE 5

A five layer polymeric web was produced by coextruding through a slot die a central core layer of propylene homopolymer containing various additives, with one intermediate layer on one surface of the core layer consisting of the above blend, an outer layer on this intermediate layer being a terpolymer of propylene, ethylene and butene-1 (4 wt % ethylene, 6 wt % butene-1, 90 wt % propylene), and another intermediate layer on the other surface of the core layer consisting of a propylene homopolymer, with an outer layer on this intermediate layer consisting of a propylene/ethylene copolymer (4 wt % ethylene, 96 wt % propylene) containing 15 wt % of titanium dioxide and 0.1 wt % of silica. A 50:50 percent by blend of granules of propylene homopolymer and granules of an ethylene/butene-1 copolymer (90 percent by weight ethylene, 10 percent by weight butene-1 was used as the feed for the extruder producing the intermediate layers. The core layer additives consisted of 10.76 wt % of titanium dioxide (mean particle size 0.1 μm), bis-ethoxylated tallow amine, erucamide, and glyceryl mono-stearate.

The web was cooled on a chill roll and then stretched 4.5 times in the direction of extrusion by passing it over a series of heated rollers rotating at different peripheral speeds. Thereafter it was stretched 10 times in the transverse direction in a stenter oven. The resulting biaxially stretched film was heat set, and then corona discharge treated on the outer surface consisting of the propylene/ethylene copolymer containing titanium dioxide, following which it was wound up into a roll.

The film had an overall thickness of 40 μm, the core layer being 27.2 μm, the intermediate layer of the polymer blend being 7 μm, and the intermediate layer of propylene homopolymer being 3 μm thick. Both each outer layers were 1.4 μm thick. This film was opaque as a result of the titanium dioxide in the core layer and one outer layer but the core layer was not voided.

EXAMPLE 6

A five layer film in accordance with the present invention was produced as described in Example 5, except that the additives in the core layer consisted of 3 wt % of calcium carbonate (mean particle size 3.5 μm), 4 wt % of titanium dioxide, bis-ethoxylated tallow amine, erucamide, and glyceryl monostearate.

The respective layers of the finished film were as given in Example 5. This film was opaque from the presence of the titanium dioxide in the core and one outer layer, the core layer of this film also being voided as a result of the presence of the calcium carbonate.

EXAMPLE 7

A five layer film similar to that of Example 5 was produced using the same polymers and additives for the respective layers except that the core layer additives consisted of 17.1 wt % of titanium dioxide (mean particle size 0.1 μm), plus bisethoxylated tallow amine, erucamide, and glyceryl mono-stearate.

The film produced had a total thickness of 50 μm, the core layer was 29.2 μm thick, the two intermediate layers were each 9 μm thick, and the two outer layers were each 1.4 μm thick.

EXAMPLE 8

A five layer film similar to that of Example 5 was produced using the same polymers and additives for the respective layers except that the intermediate layer immediately beneath the outer layer containing titanium dioxide consisted of propylene homopolymer, and the core layer additives consisted of 14.2 wt % of titanium dioxide (mean particle size 0.1 μm), plus bis-ethoxylated tallow amine, erucamide, and glyceryl mono-stearate.

The film produced had a total thickness of 50 μm, the core layer was 35.2 μm thick, the intermediate layers formed of the polymer blend was 9 μm thick, and the propylene homopolymer intermediate layer was 3 μm thick. The two outer layers were each 1.4 μm thick.

Film Testing/Evaluation

Each of the above films was heat sealed to itself, the heat seal layer having an intermediate layer of a blend of polymers beneath being used to form the heat seal. The heat seals were formed at a temperature of 130° C. under a load of 96.5 kN/m (14 psi) for a period of 1 second. After cooling, the seals were pulled apart by hand. In all cases, the originally transparent heat sealed areas peeled completely and turned white where the seals had pulled apart.

Evaluation of the peeled seals of Examples 1 to 4 by scanning electron microscopy revealed that in all cases the seals had failed by rupture of the intermediate layer immediately beneath the heat sealed heat seal layer within the thickness of the intermediate layer.

Heat sealing of the other surface of the respective films to itself gave heat seals which peeled satisfactorily in the case of Examples 5, 6 and 8. However, in the case of the other Examples, where an intermediate layer was not present below the heat seal layer used to form the heat seal, the films themselves tore or the heat seals themselves delaminated.

In a comparison test in which a three layer film was produced as described in Example 1 but without the intermediate layer, seal failure occurred by tearing of the film itself, through the thickness of the core layer.

We claim:

1. Multilayer polymeric film comprising a base layer of a propylene polymer, a non-voided intermediate layer on the base layer, and a heat sealable polymer layer on the intermediate layer, the non-voided intermediate layer having an internal cohesive strength less than the bond strength of the intermediate layer to either the base layer or the heat sealable layer and less than the internal cohesive strengths of either the base layer or the heat sealable layer such that the film peels apart by rupture within the thickness of the intermediate layer rather than by delamination of adjacent layers of the film.

2. A film according to claim 1, wherein the base layer comprises a propylene homopolymer.

3. A film according to claim 1, wherein the intermediate layer comprises a blend of a propylene polymer and an ethylene polymer.

4. A film according to claim 3, wherein the ethylene polymer contains units derived from at least one additional alpha-olefin.

5. A film according to claim 2, wherein the ethylene polymer has at least 50 percent by weight of units derived from ethylene and not more than 50 percent by weight of units derived from one or more alpha-olefin.

6. A film according to claim 2, wherein the ethylene polymer has at least 75 percent by weight of units derived from ethylene and not more than 25 percent by weight of units derived from one or more alpha-olefin.

7. A film according to claim 5, wherein the alpha-olefin is at least one of propylene or butene-1.

8. A film according to claim 5, wherein the ethylene polymer is an ethylene/butene-1 copolymer.

9. A film according to claim 8, wherein the ethylene polymer contains from 80 to 95 percent by weight of units derived from ethylene and from 20 to 5 percent by weight of units derived from butene-1 with substantially no units derived from propylene.

10. A film according to claim 9, wherein the ethylene polymer contains about 90 percent by weight of units derived from ethylene and about 10 percent by weight of units derived from butene-1.

11. A film according to claim 3, wherein the propylene polymer in the blend is a propylene homopolymer or a copolymer of propylene and not more than 2 weight percent of ethylene.

12. A film according to claim 3, wherein the blend comprises from 70 to 30 percent by weight of a propylene polymer and from 30 to 70 percent by weight of the ethylene polymer.

13. A film according to claim 12, wherein the blend comprises from 60 to 40 percent by weight of propylene polymer and from 40 to 60 percent by weight of the ethylene polymer.

14. A film according to claim 1, wherein the heat sealable polymer layer comprises a copolymer containing units derived from at least two members selected from the group consisting of ethylene, propylene and butene-1.

15. A film according to claim 14, wherein the heat sealable polymer layer comprises a propylene/ethylene copolymer of a propylene/ethylene/butene-1 terpolymer.

16. A film according to claim 1, having at least one further polymeric layer on the opposite side of base layer from the said intermediate layer and heat sealable layer.

17. A film according to claim 1, which is substantially transparent.

18. A film according to claim 1, which is opaque.

19. A film according to claim 18, wherein the base layer is voided and/or contains a pigment.

20. A film according to claim 16, wherein at least one of the said at least one further polymeric layers on the opposite side of the base layer contains a pigment.

* * * * *